US012766886B2

(12) United States Patent
Kazariya et al.

(10) Patent No.: US 12,766,886 B2
(45) Date of Patent: Oct. 20, 2026

(54) PNEUMATIC TIRE

(71) Applicant: The Yokohama Rubber Co., Ltd., Kanagawa (JP)

(72) Inventors: Ayaki Kazariya, Kanagawa (JP); Naoya Oizumi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 509 days.

(21) Appl. No.: 18/560,010

(22) PCT Filed: Mar. 31, 2022

(86) PCT No.: PCT/JP2022/016761
§ 371 (c)(1),
(2) Date: Nov. 9, 2023

(87) PCT Pub. No.: WO2022/239575
PCT Pub. Date: Nov. 17, 2022

(65) Prior Publication Data

US 2024/0227444 A1 Jul. 11, 2024

(30) Foreign Application Priority Data

May 14, 2021 (JP) ................................ 2021-082339

(51) Int. Cl.
*B60C 1/00* (2006.01)
*B60C 11/03* (2006.01)
(Continued)

(52) U.S. Cl.
CPC .......... *B60C 1/0016* (2013.01); *B60C 1/0025* (2013.01); *B60C 1/0041* (2013.01);
(Continued)

(58) Field of Classification Search
CPC combination set(s) only.
See application file for complete search history.

(56) References Cited

U.S. PATENT DOCUMENTS 5,843,249 A * 12/1998 Ryba ...................... B60C 11/04 152/209.1
9,731,555 B2 * 8/2017 Tanaka ..................... B60C 7/00
(Continued)

FOREIGN PATENT DOCUMENTS

JP 57-51504 A 3/1982
JP 2009-173797 A 8/2009
(Continued)

*Primary Examiner* — Peter A Salamon
(74) *Attorney, Agent, or Firm* — Thorpe North & Western

(57) ABSTRACT

Provided is a pneumatic tire. The cap tread layer is made of a rubber composition in which 50 parts by mass to 100 parts by mass of silica and 5 parts by mass to 25 parts by mass of carbon black are blended per 100 parts by mass of diene rubber containing 50 mass % or more of natural rubber and 20 mass % or more and 40 mass % or less of styrene-butadiene rubber. As the styrene-butadiene rubber, terminal-modified styrene-butadiene rubber having a vinyl content of 35 mass % to 70 mass % is used. As the carbon black, carbon black having a nitrogen adsorption specific surface area $N_2SA$ of less than 130 $m^2/g$ is used. The rubber composition constituting the cap tread layer is set to have a tensile product TB×EB of 12000 or more and a hardness of 60 or more and 70 or less.

6 Claims, 3 Drawing Sheets

(51) Int. Cl.
*C08K 3/04* (2006.01)
*C08K 3/36* (2006.01)
*C08L 7/00* (2006.01)
*C08L 9/06* (2006.01)

(52) U.S. Cl.
CPC ................ *B60C 11/03* (2013.01); *C08K 3/04* (2013.01); *C08K 3/36* (2013.01); *C08L 7/00* (2013.01); *C08L 9/06* (2013.01); *B60C 2001/005* (2013.01); *B60C 2011/0341* (2013.01); *C08K 2201/006* (2013.01)

(56) References Cited

U.S. PATENT DOCUMENTS

| | | | | |
|---|---|---|---|---|
| 10,300,746 | B2 * | 5/2019 | Sato | B60C 11/11 |
| 2014/0238563 | A1 * | 8/2014 | Tanaka | B60C 11/033<br>152/209.2 |
| 2017/0137615 | A1 * | 5/2017 | Nakajima | C08L 9/06 |
| 2018/0186973 | A1 * | 7/2018 | Kitago | B60C 1/00 |
| 2018/0326792 | A1 * | 11/2018 | Takano | B60C 11/1204 |

FOREIGN PATENT DOCUMENTS

| | | | |
|---|---|---|---|
| JP | 2014-162439 | A | 9/2014 |
| JP | 2015-229701 | A | 12/2015 |
| JP | 2018-188036 | A | 11/2018 |
| JP | 2020-117664 | A | 8/2020 |
| JP | 2020-193291 | A | 12/2020 |
| JP | 2021-31578 | A | 3/2021 |

* cited by examiner

PNEUMATIC TIRE

TECHNICAL FIELD

The present technology relates to a pneumatic tire mainly intended for use as an all-season tire.

BACKGROUND ART

So-called all-season tires, which are intended to be used under various weather conditions throughout the year, are demanded to exhibit excellent running performance not only on normal dry road surfaces but also on wet road surfaces in rainy weather and snowy road surfaces in winter (see, for example, Japan Unexamined Patent Publication No. 2015-229701 A). Tires for off-roading, which are intended to travel on bad roads, are demanded to have excellent off-road performance and durability capable of traveling on unpaved grassland, gravel, sandy ground, muddy ground, rocky ground surfaces, and snowy road surfaces (see, for example, Japan Unexamined Patent Publication No. 2018-188036 A). Thus, all-season tires for off-roading are demanded to have various performances described above. For example, durability performance on bad roads (hereinafter, referred to as off-road durability performance), braking performance on wet road surfaces (hereinafter, referred to as wet performance), and braking performance on snowy road surfaces (hereinafter, referred to as snow performance) are demanded to be provided in a highly compatible manner. In addition to this, improvement of fuel economy performance (reducing rolling resistance) during travel is also demanded to reduce an environmental impact.

However, even when improvement of these performances is attempted by rubber (tread rubber) constituting a tread portion of a pneumatic tire, these performances contradict each other, making these performances difficult to be provided in a compatible manner to a high degree. For example, a known method of obtaining rubber having excellent wet performance includes increasing tan δ at 0° C.; however, when the tan δ at 0° C. increases, tan δ at 60° C. also increases, and the rolling resistance cannot be reduced. Furthermore, increasing of the tan δ at 0° C. increases a glass transition temperature Tg, and degradation of the snow performance is also concerned. Alternatively, a known method of obtaining rubber having excellent snow performance includes increasing a blended amount of butadiene rubber; however, the increase in the blended amount of the butadiene rubber degrades dispersibility of silica, and thus the reduction of rolling resistance may be difficult. Furthermore, as a result of the degradation of dispersibility of silica, elongation and strength of the rubber composition may decrease to degrade off-road durability performance. Thus, measures to reduce rolling resistance while improving off-road durability performance, wet performance, and snow performance in a well-balanced manner by adjusting blends or physical properties of a tread rubber and to provide these performances in a compatible manner to a high degree have been demanded.

SUMMARY

The present technology provides a pneumatic tire that can provide reduced rolling resistance and improved off-road durability performance, wet performance, and snow performance and provide these performances in a compatible manner to a high degree.

The pneumatic tire according to an embodiment of the present technology includes:

- a tread portion extending in a tire circumferential direction and having an annular shape;
- a pair of sidewall portions respectively disposed on both sides of the tread portion;
- a pair of bead portions each disposed on an inner side of the pair of sidewall portions in a tire radial direction;
- a carcass layer mounted between the pair of bead portions; and
- a plurality of reinforcing layers disposed on an outer circumferential side of the carcass layer in the tread portion.

The tread portion is made of two layers, an undertread layer disposed on an outer circumferential side of the reinforcing layer and a cap tread layer disposed on an outer circumferential side of the undertread layer and constituting a road contact surface of the tread portion.

In the pneumatic tire, the cap tread layer is made of a rubber composition in which 50 parts by mass to 100 parts by mass of silica and 5 parts by mass to 25 parts by mass of carbon black are blended per 100 parts by mass of diene rubber containing 50 mass % or more of natural rubber and 20 mass % or more and 40 mass % or less of styrene-butadiene rubber,

- the styrene-butadiene rubber is terminal-modified styrene-butadiene rubber having a vinyl content of 35 mass % to 70 mass %, the carbon black has a nitrogen adsorption specific surface area $N_2SA$ of less than 130 $m^2/g$, and
- the rubber composition constituting the cap tread layer has a tensile product TB×EB calculated as a product of strength at break TB [unit: MPa] and elongation at break EB [unit: %] of 12000 or more and has a hardness of 60 or more and 70 or less.

In the pneumatic tire according to an embodiment of the present technology, a tread portion is made of two layers, a cap tread layer and an undertread layer, the cap tread layer is made of a rubber composition having the blend described above, and the rubber physical properties are set as described above. This can reduce rolling resistance while improving off-road durability performance, wet performance, and snow performance. In an embodiment of the present technology, "strength at break TB" and "elongation at break EB" of the rubber composition are stress at break (strength at break; unit: MPa) and elongation ratio at break (elongation at break; unit: %) determined in accordance with JIS (Japanese Industrial Standard) K6251 by punching out a JIS No. 3 dumbbell test piece (thickness: 2 mm) and measuring under the conditions of a temperature of 20° C. and a tensile speed of 500 mm/minute. Furthermore, "hardness" of the rubber composition was a value measured at a temperature of 23° C. by using a type A durometer in accordance with JIS K 6253.

In an embodiment of the present technology, the styrene-butadiene rubber preferably has the vinyl content ranging from 55 mass % to 70 mass % and a styrene content ranging from 20 mass % to 30 mass %. The diene rubber preferably contains 5 mass % or more and 20 mass % or less of butadiene rubber besides the natural rubber and the styrene-butadiene rubber. Such a blend advantageously reduces rolling resistance while improving off-road durability performance, wet performance, and snow performance.

In an embodiment of the present technology, preferably, on an outer surface of the tread portion, four main grooves extending along the tire circumferential direction and a plurality of land portions defined by the main grooves are formed, the four main grooves include two center main grooves disposed on both sides of a tire equator, and two shoulder main grooves disposed on an outer side in a tire width direction of each of the two center main grooves, each of the main grooves has a circumferential extending portion extending in the tire circumferential direction and is formed in a step shape at different positions in the tire width direction, in between the center main groove and the shoulder main groove that are adjacent, a second lug groove extending in the tire width direction and having both ends opening to the center main groove and the shoulder main groove is disposed, in an outer side in the tire width direction of the shoulder main groove, a shoulder lug groove extending in the tire width direction across the ground contact edge E and having one end opening to the shoulder main groove is disposed, the second lug groove and the shoulder lug groove have inclination directions in the tire circumferential direction with respect to the tire width direction opposite to each other, of a plurality of the second lug grooves disposed side by side in the tire circumferential direction, two types of the second lug grooves having different inclination angles with respect to the tire width direction are alternately disposed, the second lug grooves opening to the center main groove and the shoulder main groove open to the circumferential extending portion located closer to the second lug groove of the circumferential extending portions each included in the center main groove and the shoulder main groove formed in the step shape, and the shoulder lug groove opening to the shoulder main groove opens to the circumferential extending portion located closer to the shoulder lug groove of the circumferential extending portions included in the shoulder main groove formed in the step shape. In constituting the tread portion with the rubber composition described above, employing the tread pattern described above advantageously reduces rolling resistance while improving off-road durability performance, wet performance, and snow performance.

The "ground contact edge" refers to an end portion of a ground contact region in a tire width direction. The ground contact region is formed when a regular load is applied to the tire mounted on a regular rim, inflated to a regular internal pressure, and placed vertically on a flat surface. "Regular rim" refers to a rim defined by a standard for each tire according to a system of standards that includes standards with which tires comply, and is "standard rim" defined by Japan Automobile Tyre Manufacturers Association (JATMA), "Design Rim" defined by The Tire and Rim Association, Inc. (TRA), or "Measuring Rim" defined by European Tire and Rim Technical Organization (ETRTO), for example. In the system of standards, including standards with which tires comply, "regular internal pressure" is air pressure defined by each of the standards for each tire and refers to "maximum air pressure" in the case of JATMA, the maximum value being listed in the table "TIRE LOAD LIMITS AT VARIOUS COLD INFLATION PRESSURES" in the case of TRA, or "INFLATION PRESSURE" in the case of ETRTO. However, "regular internal pressure" is 180 kPa in a case where a tire is for a passenger vehicle. "Regular load" is a load defined by a standard for each tire according to a system of standards that includes standards with which tires comply, and refers to a "maximum load capacity" in the case of JATMA, the maximum value being listed in the table of "TIRE LOAD LIMITS AT VARIOUS COLD INFLATION PRESSURES" in the case of TRA, or "LOAD CAPACITY" in the case of ETRTO. "Regular load" corresponds to 88% of the loads described above in a case where a tire is for a passenger vehicle.

DETAILED DESCRIPTION

Configurations of embodiments of the present technology will be described in detail below with reference to the accompanying drawings.

Figure 1:
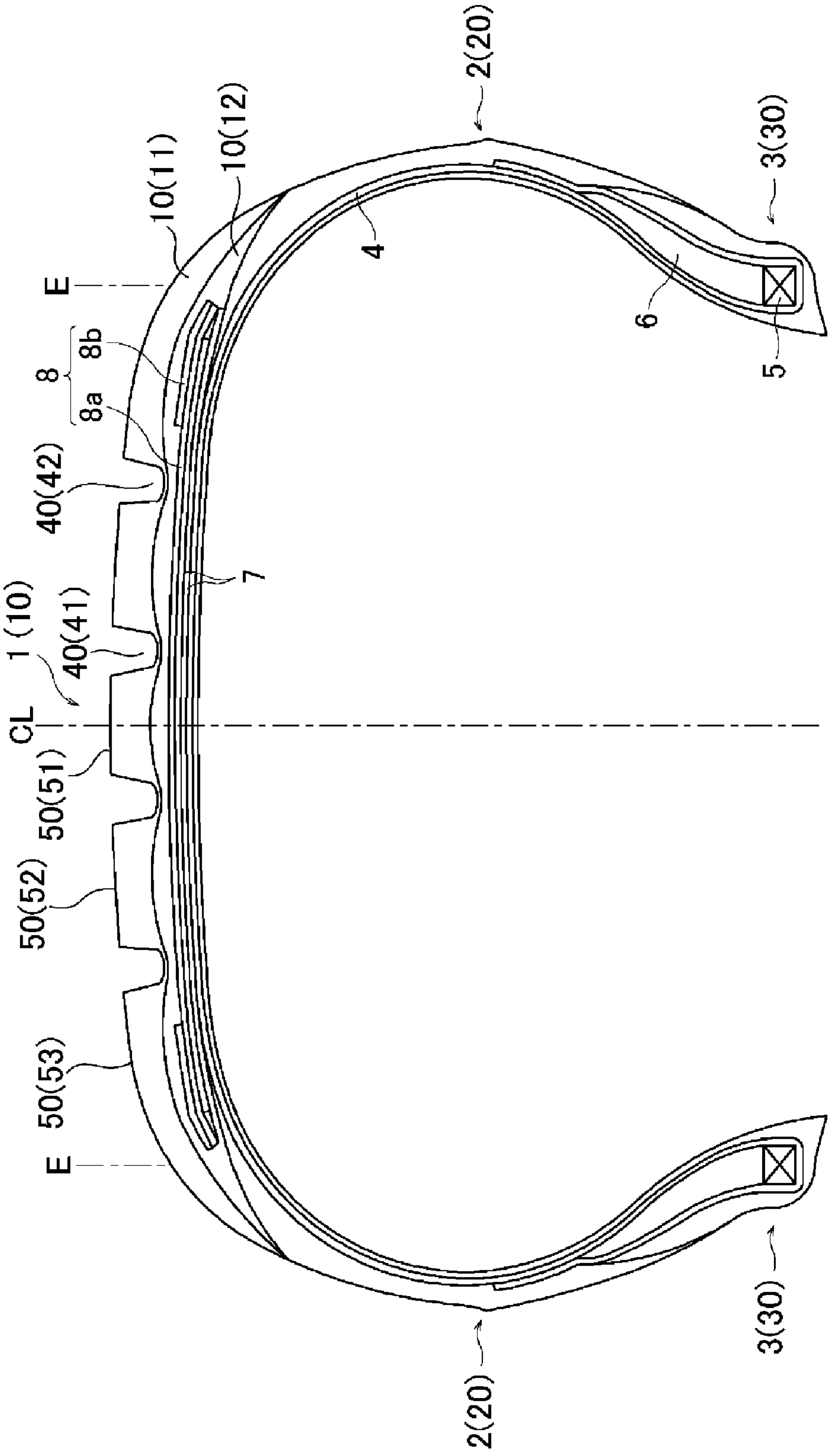
FIG. 1 is a meridian cross-sectional view illustrating an example of a pneumatic tire of an embodiment of the present technology.

As illustrated in FIG. 1, a pneumatic tire according to an embodiment of the present technology includes a tread portion 1, a pair of sidewall portions 2 respectively disposed on both sides of the tread portion 1, and a pair of bead portions 3 respectively disposed on an inner side in a tire radial direction of the sidewall portions 2. In FIG. 1, a reference sign CL denotes a tire equator, and a reference sign E denotes a ground contact edge. Although not illustrated in FIG. 1 that is a meridian cross-sectional view, the tread portion 1, the sidewall portions 2, and the bead portions 3 each extend in the tire circumferential direction and have an annular shape, forming a basic structure of a toroidal shape of the pneumatic tire. Although the description using FIG. 1 is basically based on the illustrated meridian cross-sectional shape, all of the tire components extend in the tire circumferential direction and form the annular shape.

A carcass layer 4 is mounted between the left-right pair of bead portions 3. The carcass layer 4 includes a plurality of reinforcing cords (carcass cords) extending in the tire radial direction and covered with a coating rubber and is folded back around a bead core 5 disposed in each of the bead portions 3 from an inner side to an outer side in a tire width direction. A bead filler 6 is disposed on an outer periphery of the bead core 5, and the bead filler 6 is enveloped by a body portion and a folded back portion of the carcass layer 4.

In an example of FIG. 1, a plurality of belt layers 7 (two layers) are provided on an outer circumferential side of the carcass layer 4 in the tread portion 1. Each of the belt layers 7 includes a plurality of reinforcing cords (belt cords) inclining with respect to the tire circumferential direction, with the belt cords of the layers intersecting each other. In the belt layers 7, an inclination angle of the belt cord with respect to the tire circumferential direction is set within a range, for example, from 10° to 40°. As the belt cord, for example, a steel cord can be used.

In an example of FIG. 1, a plurality of belt cover layers 8 (two layers) is provided on an outer circumferential side of the belt layer 7. Of the two belt cover layers 8 of an illustrated example, one is a full cover layer 8a that covers the entire region of the belt layer 7, and the other is a pair of edge cover layers 8b that locally cover both end portions of the belt layers 7. The belt cover layer 8 includes a reinforcing cord (belt cover cord) oriented in the tire circumferential direction. In the belt reinforcing layer 8, an angle of the belt cover cord with respect to the tire circumferential direction is set to, for example, from 0° to 5°. As the belt cover cord, for example, an organic fiber cord can be used.

In an embodiment of the present technology, these belt layers 7 and the belt cover layers 8 may hereinafter collectively be referred to as a reinforcing layer. In an embodiment of the present technology, as the reinforcing layer, only the belt layers 7 may be provided, or both of the belt layers 7 and the belt cover layers 8 may be provided. The "outer circumferential side of the reinforcing layer" in the description below means an outer circumferential side of a belt layer 7 (especially, an outermost layer of the plurality of belt layers 7 in the tire radial direction) in a case where only the belt layers 7 are provided, or means an outer circumferential side of a belt cover layer 8 (especially, an outermost layer of the plurality of belt cover layers 8 in the tire radial direction) in a case where the belt layers 7 and the belt cover layers 8 are provided.

In the tread portion 1, a tread rubber layer 10 is disposed on the outer circumferential side of the above-mentioned carcass layer 4 and reinforcing layer (the belt layers 7 and the belt cover layers 8). In an embodiment of the present technology, the tread rubber layer 10 has a structure in which two types of rubber layers having different physical properties (a cap tread layer 11 and an undertread layer 12) are layered in the tire radial direction. The cap tread layer 11 is disposed on outer circumferential side of the undertread layer 12 and constitutes a road contact surface of the tread portion 1. The undertread layer 12 is sandwiched between the cap tread layer 11 and the reinforcing layer. A side rubber layer 20 is disposed on the outer circumferential side (the outer side in the tire width direction) of the carcass layer 4 in the sidewall portion 2, and a rim cushion rubber layer 30 is disposed on the outer circumferential side (the outer side in the tire width direction) of the carcass layer 4 in the bead portion 3.

An embodiment of the present technology mainly relates to the rubber composition constituting the tread portion 1 (especially, cap tread layer 11), and thus other portions and constituent members are not limited to the structure described above. In the following description, a rubber composition constituting the cap tread layer 11 may be referred to as a cap tread rubber, and a rubber composition constituting the undertread layer 12 may be referred to as an undertread rubber.

In the rubber composition constituting the cap tread layer 11, the rubber component contains indispensably two types of components that are natural rubber and styrene-butadiene rubber, and can optionally use butadiene rubber in combination, and the total of these is 100 mass %. In an embodiment of the present technology, combined use of these two types or three types of rubbers in the proportions described below allows off-road durability performance, snow performance, wet performance, and rolling resistance performance to be improved.

The natural rubber is not limited as long as the natural rubber is typically used for rubber compositions for tires. Off-road durability performance can be further enhanced by blending the natural rubber. The content of the natural rubber is 50 mass % or more, and preferably 50 mass % or more and 60 mass % or less, per 100 mass % of the rubber component. When the content of the natural rubber is less than 50 mass %, off-road durability performance cannot be sufficiently improved.

The styrene-butadiene rubber used in an embodiment of the present technology is terminal-modified styrene-butadiene rubber having a vinyl content of 35 mass % to 70 mass % and preferably of 55 mass % to 70 mass %. Use of such terminal-modified styrene-butadiene rubber allows wet performance and low rolling resistance to be improved. The styrene content in the styrene-butadiene rubber is not limited to a particular content and preferably ranges from 20 mass % to 40 mass % and more preferably from 20 mass % to 30 mass %. The type of modification group in the terminal-modified styrene-butadiene rubber is not particularly limited as long as the vinyl content (and the styrene content) satisfies the condition described above, and examples thereof include an epoxy group, a carboxy group, an amino group, a hydroxy group, an alkoxy group, a silyl group, an alkoxysilyl group, an amide group, an oxysilyl group, a silanol group, an isocyanate group, an isothiocyanate group, a carbonyl group, an aldehyde group, and a siloxane group. Among these modification groups, an amino group, an alkoxysilyl group, and a silanol group can be suitably used. Furthermore, the weight average molecular weight (Mw) of the terminal-modified styrene-butadiene rubber of an embodiment of the present technology preferably ranges from $2.5\times10^5$ to $5.0\times10^5$ and more preferably from $3.0\times10^5$ to $4.0\times10^5$. By using the terminal-modified styrene-butadiene rubber having a relatively low molecular weight as described above and having a large number of molecular chain terminals, the number of modification group can be increased, and silica can be more efficiently dispersed in the diene rubber. The "weight average molecular weight (Mw)" in an embodiment of the present technology refers to a weight average molecular weight determined by gel permeation chromatography (GPC) based on calibration with polystyrene.

The content of the styrene-butadiene rubber is 20 mass % or more and 40 mass % or less, and preferably 30 mass % or more and 40 mass % or less, per 100 mass % of the rubber component. The content of the styrene-butadiene rubber of less than 20 mass % degrades wet performance. The content of the styrene-butadiene rubber of more than 40 mass % degrades snow performance.

As described above, the rubber component of an embodiment of the present technology can optionally use butadiene rubber in combination; however, the type of butadiene rubber is not limited to a particular type. In a case where butadiene rubber is used in combination, the content thereof is preferably 5 mass % or more and 20 mass % or less and more preferably 5 mass % or more and 15 mass % or less per 100 mass % of the rubber component. The content of the butadiene rubber of less than 5 mass % degrades wear resistance. The content of the butadiene rubber of more than 20 mass % degrades wet performance.

Silica is indispensably blended in the rubber composition constituting the cap tread layer 11. Examples of the silica that can be used include wet silica (hydrous silicic acid), dry silica (silicic anhydride), calcium silicate, and aluminum silicate. These silicas may be used alone or used by combining two or more types of silicas. Surface-treated silica, in which the surface of silica is treated with a silane coupling agent, may also be used. By the blending of the silica, rubber hardness of the rubber composition can be increased, and excellent off-road durability performance can be achieved when a pneumatic tire is formed. The blended amount of silica ranges from 50 parts by mass to 100 parts by mass and preferably from 65 parts by mass to 85 parts by mass per 100 parts by mass of the rubber component described above. The blended amount of the silica of less than 50 parts by mass degrades wet performance. The blended amount of silica of more than 100 parts by mass degrades off-road durability performance.

The CTAB (cetyltrimethylammonium bromide) adsorption specific surface area of the silica is not limited to a particular area and preferably ranges from 130 $m^2/g$ to 185 $m^2/g$ and more preferably from 155 $m^2/g$ to 175 $m^2/g$. Setting the CTAB adsorption specific surface area of the silica to 130 $m^2/g$ or more allows wet performance to be improved. Furthermore, by setting the CTAB adsorption specific surface area of the silica to 185 $m^2/g$ or less, low rolling resistance performance can be improved. In an embodiment of the present technology, the CTAB adsorption specific surface area of silica is a value measured in accordance with ISO 5794.

Carbon black is indispensably blended in the rubber composition constituting the cap tread layer 11 in addition to the silica. By the blending of the carbon black, rubber hardness of the rubber composition can be increased, and excellent off-road durability performance can be achieved when a pneumatic tire is formed. The blended amount of the carbon black ranges from 5 parts by mass to 25 parts by mass and preferably from 8 parts by mass to 15 parts by mass per 100 parts by mass of the rubber component described above. The blended amount of the carbon black of less than 5 parts by mass degrades off-road durability performance. The blended amount of the carbon black of more than 25 parts by mass degrades wet performance and low rolling resistance performance.

The nitrogen adsorption specific surface area ($N_2SA$) of the carbon black used in an embodiment of the present technology is less than 130 $m^2/g$ and preferably from 126 $m^2/g$ to 79 $m^2/g$. By using such a carbon black, rolling resistance can be reduced. The nitrogen adsorption specific surface area of the carbon black of 130 $m^2/g$ or more cannot reduce rolling resistance. In an embodiment of the present technology, the nitrogen adsorption specific surface area of carbon black is a value measured in accordance with JIS K 6217-2.

The rubber composition constituting the cap tread layer 11 can contain another filler besides the silica and the carbon black described above. Examples of the other fillers include calcium carbonate, magnesium carbonate, talc, clay, alumina, aluminum hydroxide, titanium oxide, and calcium sulfate. These other fillers may be used alone or used by combining two or more types of fillers.

In the rubber composition constituting the cap tread layer 11, a silane coupling agent is preferably blended together with the silica described above. The silane coupling agent can improve the dispersibility of the silica. The blended amount of the silane coupling agent preferably ranges from 6 mass % to 12 mass % and more preferably from 8 mass % to 10 mass % of the silica. The blended amount of the silane coupling agent of less than 6 mass % may be unable to sufficiently improve dispersibility of the silica. The blended amount of the silane coupling agent of more than 12 mass % may cause premature vulcanization of the rubber composition and degrade the forming processability.

The silane coupling agent is not particularly limited as long as the silane coupling agent can be used for a rubber composition for a tire. Examples thereof include sulfur-containing silane coupling agents such as bis(3-triethoxysilylpropyl)tetrasulfide, bis(3-triethoxysilylpropyl)disulfide, 3-trimethoxysilylpropyl benzothiazole tetrasulfide, γ-mercaptopropyl triethoxysilane, and 3-octanoylthiopropyl triethoxysilane. Among these, the silane coupling agent having a mercapto group is preferred, and the affinity to silica can be enhanced, and the dispersibility can be improved. These silane coupling agents can be blended alone or blended by combining multiple types of agents.

In an embodiment of the present technology, the rubber composition constituting the cap tread layer 11 may contain various additives, such as a vulcanization or crosslinking agent, a vulcanization accelerator, various oils, an anti-aging agent, and a plasticizer, that are typically used for rubber compositions for tires besides the compounding agents described above in a range that does not impair the present technology. These additives can be kneaded by a typical method to form a rubber composition to be used for vulcanization or crosslinking. The blended amounts of these additives may be known typical blended amounts without departing from the present technology. The rubber composition for a tire can be produced by mixing each component described above by using a common rubber kneading machine such as a Banbury mixer, a kneader, and a roll.

When the strength at break is TB [unit: MPa] and the elongation at break is EB [unit: %] for the cap tread rubber made of the blend described above and when a tensile product calculated as a product of these is TB×EB, the tensile product TB×EB of the cap tread rubber of an embodiment of the present technology is 12000 or more, and preferably 12500 or more. Furthermore, the hardness of the cap tread rubber of an embodiment of the present technology is 60 or more and 70 or less, and preferably 64 or more and 68 or less. Setting the tensile product and the hardness in this manner advantageously provides off-road durability performance, snow performance, wet performance, and rolling resistance performance in a well-balanced and compatible manner. The tensile product TB×EB of the cap tread rubber of less than 12000 degrades off-road durability performance. The hardness of the cap tread rubber of less than 60 cannot improve off-road durability performance. The hardness of the cap tread rubber of more than 70 cannot improve snow performance.

Values of the strength at break TB and the elongation at break EB used for the calculation of the tensile product described above are not limited to particular values, and the strength at break TB preferably ranges from 23 MPa to 28 MPa and more preferably from 24 MPa to 27 MPa, and the elongation at break EB is preferably 450% or more and more preferably 550% or more. Setting the values in this manner makes the rubber physical properties better and advantageously provides off-road durability performance, snow performance, wet performance, and rolling resistance performance in a well-balanced and compatible manner.

Figure 2:
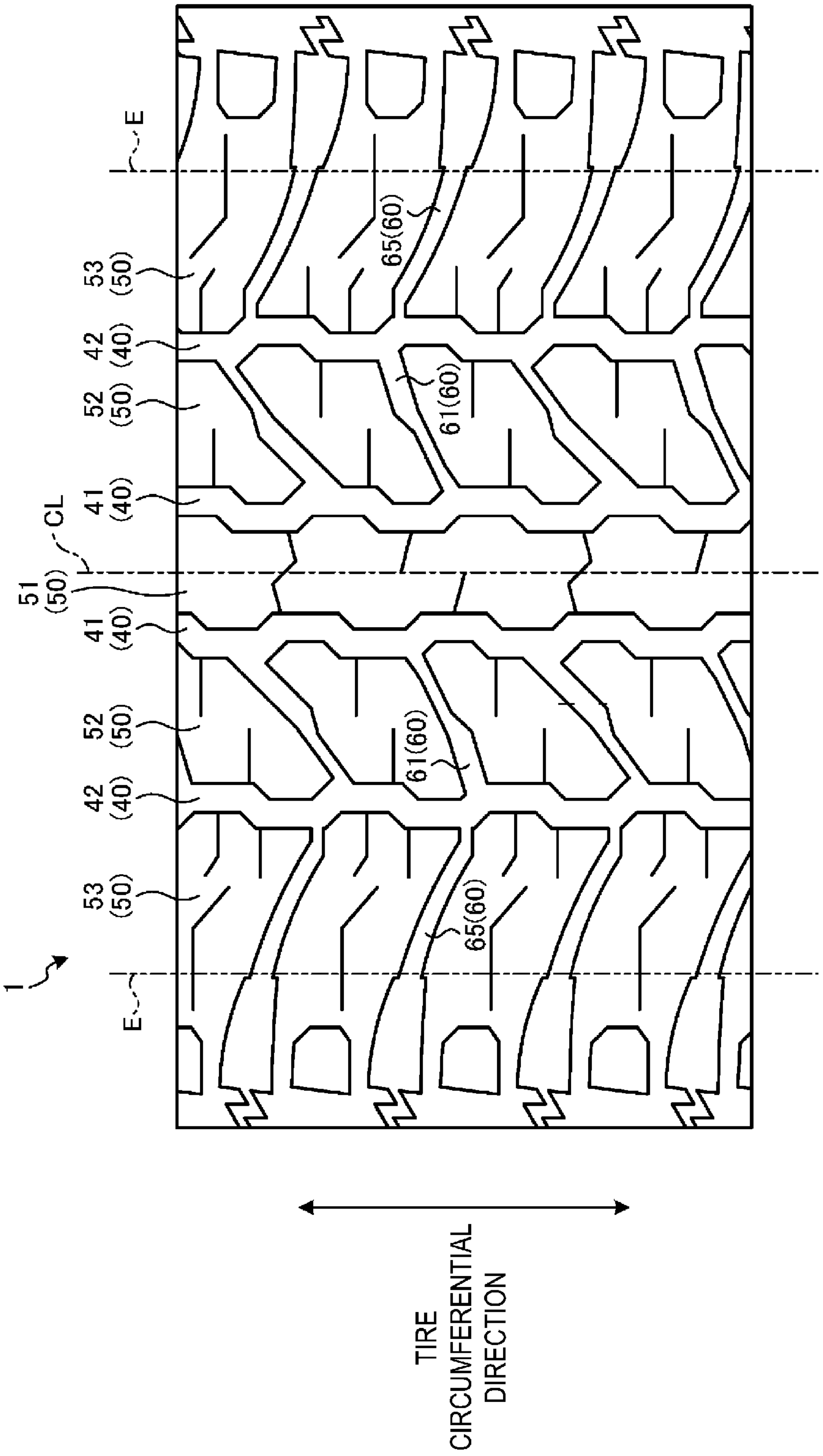
FIG. 2 is a front view illustrating an example of a tread pattern of a pneumatic tire according to an embodiment of the present technology.

When the cap tread rubber described above is used for a tread portion 1 (cap tread layer 11) of a pneumatic tire, a tread pattern formed on an outer surface of the tread portion 1 is not limited to a particular pattern and is, for example, preferably an aspect illustrated in FIG. 2. The tread pattern of FIG. 2 is a pattern suitable for off-road traveling and has excellent off-road durability performance, snow performance, and wet performance, and thus can effectively enhance various tire performances described above, which are targets of an embodiment of the present technology, when combined with the cap tread rubber described above.

In the example of FIG. 2, four main grooves 40 are formed in a tread portion 1. Each two of the four main grooves 40 are disposed on both sides in the tire width direction of the tire equatorial plane CL and, in this way, the four main grooves are formed side by side in the tire width direction. In other words, the four main grooves 30 in total are formed in the tread portion 1, including: two center main grooves 41 disposed on both sides of the tire equatorial plane CL; and two shoulder main grooves 42 disposed on an outer side in the tire width direction of each of the two center main grooves 41.

A "main groove 40" refers to a vertical groove in which at least a part is extending in the tire circumferential direction. In general, the main groove 40 has a groove width of 3 mm or more and a groove depth of 6 mm or more and has a tread wear indicator (slip sign) therein, indicating terminal stages of wear. In the present embodiment, the main groove 40 has a groove width of 5 mm or more and 8 mm or less and a groove depth of 8 mm or more and 9 mm or less, and the extension direction is substantially parallel to a tire equator line (centerline) where the tire equatorial plane CL and the tread ground contact surface 3 intersect.

The "groove width" is the maximum value of the distance between facing groove walls measured at the groove opening portion when the tire is mounted on a specified rim, inflated to the specified internal pressure, and in an unloaded state. In a configuration in which the land portion includes a notch portion or a chamfered portion on an edge portion thereof, the groove width is measured with intersection points between the tread ground contact surface and extension lines of the groove walls as measurement points, in a cross-sectional view with the groove length direction as a normal line direction. In a configuration in which the grooves extend in a zigzag shape or a wave shape in the tire circumferential direction, the groove width is measured with reference to the center line of the oscillation of the groove walls as measurement points. The "groove depth" is the maximum value of a distance from the tread ground contact surface to the groove bottom and is measured when the tire is mounted on a specified rim, inflated to the specified internal pressure, and in an unloaded state. In a configuration in which the grooves include a partially uneven portion or sipe on the groove bottom, the groove depth is measured excluding these portions.

The plurality of the land portions 50 defined by the main grooves 40 include a center land portion 51, a second land portion 52, and a shoulder land portion 53. Among these, the center land portion 51 is disposed between the two center main grooves 41 and located on the tire equatorial plane CL, and both sides in the tire width direction are defined by the center main grooves 41. Moreover, the second land portion 52 is positioned between the center main groove 41 and the shoulder main groove 42 that are adjacent in the tire width direction and disposed on the outer side in the tire width direction of the center land portion 51, and both sides in the tire width direction of the second land portion 52 are defined by the center main groove 41 and the shoulder main groove 42. In addition, the shoulder land portion 53 is disposed on the outer side of the shoulder main groove 42 in the tire width direction, is disposed adjacent to the second land portion 52 by interposing the shoulder main groove 42 therein, and is defined by the shoulder main groove 42 on the inner side in the tire width direction.

On the outer surface (tread ground contact surface) of the tread portion 1, a plurality of lug grooves 60 extending in the tire width direction is formed, and the lug grooves 60 include a second lug groove 61 and a shoulder lug groove 65. In the present embodiment, the lug groove 60 has a groove width of 1.6 mm or more and 6 mm or less and a groove depth of 4 mm or more and 7 mm or less. Among the second lug groove 61 and the shoulder lug groove 65, the second lug groove 61 is disposed between the adjacent center main groove 41 and the shoulder main groove 42, extends in the tire width direction, and has ends opening to the center main groove 41 and the shoulder main groove 42. Furthermore, the shoulder lug groove 65 is disposed on the outer side of the shoulder main groove 42 in the tire width direction, extends in the tire width direction across the ground contact edge E, and has one end opening to the shoulder main groove 42.

Among the land portions 50 defined by the main grooves 40, the second land portion 52 having both sides in the tire width direction defined by the center main groove 41 and the shoulder main groove 42 have both sides in the tire circumferential direction defined by the second lug grooves 61 that are adjacent in the tire circumferential direction. The ends of the second lug groove 61 open to the center main groove 41 and the shoulder main groove 42, and thus the second land portion 52 having both sides in the tire circumferential direction defined by the second lug grooves 61 is formed as a block-shaped land portion 50. Similarly, the shoulder land portion 53 having the inner side in the tire width direction defined by the shoulder main groove 42 has both sides in the tire circumferential direction defined by the shoulder lug grooves 65 that are adjacent in the tire circumferential direction. The shoulder lug groove 65 extends in the tire width direction across the ground contact edge E, and thus at least a portion on the inner side in the tire width direction from the ground contact edge E of the shoulder land portion 53 having both sides in the tire circumferential direction defined by the shoulder lug grooves 65 is formed in a block shape. Meanwhile, the center land portion 51 having both sides in the tire width direction defined by the center main grooves 41 is formed as a rib-shaped land portion 50 formed continuously in the tire circumferential direction without being separated by the lug groove 60.

Figure 3:
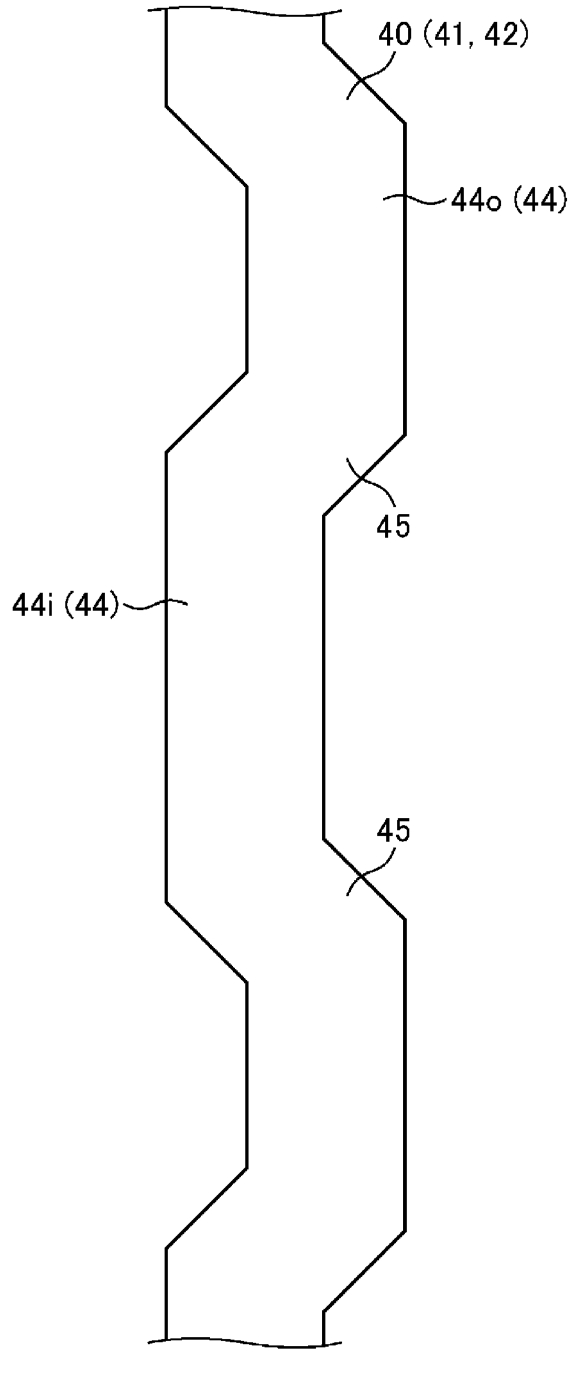
FIG. 3 is an explanatory diagram illustrating an enlargement of a main groove illustrated in FIG. 2.

FIG. 3 is a detailed view of the main groove 40 illustrated in FIG. 2. In the tread portion 1, the four main grooves 40, which are the two center main grooves 41 and the two shoulder main grooves 42, are disposed, and each of the main grooves 40 is formed in a step shape having circumferential extending portions 44 extending in the tire circumferential direction at positions that are different in the tire width direction. The "step shape" herein refers to a shape in which a center line indicating the center in the groove width direction is oscillated in a rectangular wave or a trapezoidal wave. In other words, the main groove 40 includes two types of circumferential extending portions 44 located at positions that are different from each other in the tire width direction, and the two types of the circumferential extending portions 44 are alternately disposed in the tire circumferential direction, and the end portions of the circumferential extending portions 44 that are different but adjacent in the tire circumferential direction are connected by the connection portion 45. The connection portion 45 also constitutes the main groove 40.

The two types of the circumferential extending portions 44 include, for example, a plurality of the inner circumferential extending portions **44*i* and a plurality of the outer circumferential extending portions 44*o* located on the outer side in the tire width direction from the inner circumferential extending portions 44*i*, and the inner circumferential extending portions 44*i* and the outer circumferential extending portions 44*o* are alternately disposed in the tire circumferential direction. For these inner circumferential extending portions 44*i* and the outer circumferential extending portions 44*o*, the inner circumferential extending portions 44*i* are located at the same position in the tire width direction, and the outer circumferential extending portions 44***o* are located at the same position in the tire width direction.

Furthermore, the connection portion 45 connects close end portions of the inner circumferential extending portion 44*i* and the outer circumferential extending portion 44*o* that are adjacent in the tire circumferential direction, and in the present embodiment, the connection portion 45 extends inclined in the tire circumferential direction with respect to the tire width direction. Thus, in the present embodiment, the main groove 40 formed in the step shape is formed in a so-called a trapezoidal wave shape. As described above, in the main groove 40 including the inner circumferential extending portion 44*i*, the outer circumferential extending portion 44*o*, and the connection portion 45, the groove width of the inner circumferential extending portion 44*i*, the outer circumferential extending portion 44*o*, and the connection portion 45 are substantially constant in one main groove 40.

The lug groove 60 opens to the main groove 40 formed as described above; however, among the two types of the circumferential extending portions 44 included in the main groove 40, the lug groove 60 opens to the circumferential extending portion 44 on the side where the lug groove 60 opening to the main groove 40 is located in the tire width direction. For example, the second lug groove 61 opening to the center main groove 41 and the shoulder main groove 42 opens to the circumferential extending portion 44 located closer to the second lug groove 61 among the circumferential extending portions 44 included in each of the center main groove 41 and the shoulder main groove 42 formed in the step shape. That is, the second lug groove 61 opens to the center main groove 41 from the outer side in the tire width direction with respect to the center main groove 41, and thus the second lug groove 61 opens to the outer circumferential extending portion 44*o* included in the center main groove 41. Furthermore, the second lug groove 61 opens to the shoulder main groove 42 from the inner side in the tire width direction with respect to the shoulder main groove 42, and thus the second lug groove 61 opens to the inner circumferential extending portion 44*i* included in the shoulder main groove 42.

Furthermore, the shoulder lug groove 65 opening to the shoulder main groove 42 opens to the circumferential extending portion 44 located closer to the shoulder lug groove 65 among the circumferential extending portions 44 included in the shoulder main groove 42 formed in the step shape. That is, the shoulder lug groove 65 opens to the shoulder main groove 42 from the outer side in the tire width direction with respect to the shoulder main groove 42, and thus the shoulder lug groove 65 opens to the outer circumferential extending portion 44*o* included in the shoulder main groove 42. The second lug groove 61 and the shoulder lug groove 65 opening to the shoulder main groove 42 from the inner side and the outer side of the shoulder main groove 42 in the tire width direction open to different circumferential extending portions 44, and thus the second lug groove 61 and the shoulder lug groove 65 open at different positions of the shoulder main groove 42 in the tire circumferential direction.

As described above, the second lug groove 61 and the shoulder lug groove 65 opening to the main groove 40 each extend in the tire width direction and are formed inclined in the tire circumferential direction with respect to the tire width direction. At this time, inclination directions of the second lug groove 61 and the shoulder lug groove 65, toward the tire circumferential direction with respect to the tire width direction, are opposite to each other. For example, when the second lug groove 61 and the shoulder lug groove 65 extend towards the outer side of the tire width direction from the inner side of the tire width direction, the second lug groove 61 and the shoulder lug groove 65 both extend in the tire width direction and incline toward the tire circumferential direction; however, the directions toward the tire circumferential direction of the second lug groove 61 and the shoulder lug groove 65 are opposite to each other.

Furthermore, among the plurality of the second lug grooves 61 disposed side by side in the tire circumferential direction, two types of second lug grooves 61 having different inclination angles with respect to the tire width direction are alternately disposed. That is, the second lug grooves 61 include a first second lug groove 62 and a second second lug groove 63 having inclination angles that are different from each other with respect to the tire width direction and being alternately disposed in the tire circumferential direction. Thus, the second land portion 52 having both sides in the tire circumferential direction defined by the second lug grooves 61 that are adjacent in the tire circumferential direction has both side in the tire circumferential direction defined by the first second lug groove 62 and the second lug groove 63 that are adjacent in the tire circumferential direction.

An embodiment of the present technology will further be described below by way of Examples, but the scope of an embodiment of the present technology is not limited to Examples.

EXAMPLES

Twenty types of pneumatic tires (test tires) each having a basic structure illustrated in FIG. 1 and having a tire size of 285/60R18 were produced (Standard Example 1, Comparative Examples 1 to 6, and Examples 1 to 13). In each of the examples, a cap tread rubber constituting a cap tread layer has blends and physical properties listed in Tables 1 to 3 (Table 3 is a common compound for all examples). For tread patterns, as listed in Tables 1 to 2, shape of main grooves, whether inclination directions of a second lug groove and a shoulder lug groove are the same or opposite (row of "inclination directions of lug grooves" in the tables), presence or absence of two types of second lug grooves having different inclination angles (row of "two types of second lug grooves" in the tables), and whether a lug groove opens to a circumferential extending portion located closer to the lug groove (row of "opening position of lug groove" in the tables) were made different.

In preparing the cap tread rubbers used in the examples (rubber compositions for tires), ingredients other than a vulcanization accelerator and sulfur were weighed and kneaded in a 1.8 L sealed Banbury mixer for 5 minutes. Then, a master batch was discharged and cooled at room temperature. Thereafter, the master batch was added into the 1.8 L sealed Banbury mixer, and the vulcanization accelerator and sulfur were added and mixed for 2 minutes. Thus, each of the rubber compositions for tires was obtained.

The physical properties listed in Tables 1 and 2 were measured by using a vulcanized rubber test piece made of each of the rubber compositions for tires. The test piece was produced by vulcanizing the cap tread rubber (rubber composition for a tire) used in each of the examples at 145° C. for 35 minutes in a mold having a predetermined shape. Specifically, "Hardness" was a value measured at a temperature of 20° C. by using a type A durometer in accordance with JIS K 6253. Furthermore, "Strength at break TB" and "Elongation at break EB" were stress at break (strength at break; unit: MPa) and elongation ratio at break (elongation at break; unit: %) determined in accordance with JIS K 6251 by punching out a JIS No. 3 dumbbell test piece (thickness: 2 mm) and measuring under the conditions of a temperature of 20° C. and a tensile speed of 500 mm/minute. The tensile product is a product TB×EB of "Strength at break TB" and "Elongation at break EB" and was calculated based on the values in each of the examples.

For rows of "Shape of main groove" in Tables 1 and 2, a case where the shape of the main groove was a step shape having circumferential extending portions extending in the tire circumferential direction at positions that were different in the tire width direction was indicated as "Step", and a case where the shape of the main groove was a zigzag shape that oscillated in the tire width direction and extended in the tire circumferential direction was indicated as "Zigzag". For rows of "Inclination directions of lug grooves" in Tables 1 and 2, a case where the inclination directions of the second lug groove and the shoulder lug groove were the same was indicated as "Same", and a case where the inclination directions were opposite was indicated as "Opposite". For rows of "Two types of second lug grooves" in Tables 1 and 2, a case where two types of second lug grooves having different inclination angles were included was indicated as "Yes", and a case where inclination angles of all the second lug grooves were the same was indicated as "No". For rows of "Opening position of lug groove" in Tables 1 and 2, a case where the lug groove opened to a circumferential extending portion closer to the lug groove was indicated as "Open", and a case where the lug groove opened to a circumferential extending portion far from the lug groove was indicated as "Not open".

For each of the test tires, snow performance, wet performance, low rolling performance, and off-road durability performance were evaluated by the following methods.

Snow Performance

Each of the test tires was assembled on a rim wheel having a rim size of 18×8J, inflated to an air pressure of 230 kPa, and mounted on a test vehicle, which was a four-wheel drive SUV (sport utility vehicle). Braking was performed from a traveling condition at a speed of 40 km/h on an icy and snowy road surface, and a braking distance until the test vehicle came to a complete stop was measured. The evaluation results are expressed as index values with Standard Example 1 being assigned 100 by using the reciprocal of the measurement values. Larger index values indicate shorter braking distance and excellent braking performance on icy and snowy road surfaces (snow performance). An index value of "98" or more means that adequate snow performance is obtained.

Wet Performance

Each of the test tires was assembled on a rim wheel having a rim size of 18×8J, inflated to an air pressure of 230 kPa, and mounted on a test vehicle, which was a four-wheel drive SUV. Braking was performed from a traveling condition at a speed of 100 km/h on a wet road surface, and a braking distance until the test vehicle came to a complete stop was measured. The evaluation results are expressed as index values with Standard Example 1 being assigned 100 by using the reciprocal of the measurement values. Larger index values indicate shorter braking distance and excellent braking performance on wet road surfaces (wet performance).

Low Rolling Performance

Each of the test tires was assembled on a rim wheel having a rim size of 18×8J. Rolling resistance was measured in accordance with ISO 28580 using a drum testing machine having a drum diameter of 1707.6 mm under the conditions of an air pressure of 240 kPa, a load of 4.82 kN, and a speed of 80 km/h. The evaluation results are expressed as index values with Standard Example 1 being assigned 100 by using the reciprocal of the measurement values. Larger index values indicate lower rolling resistance and excellent low rolling performance.

Off-Road Durability Performance

Each of the test tires was assembled on a rim wheel having a rim size of 18×8J, inflated to an air pressure of 230 kPa, and mounted on a test vehicle, which was a four-wheel drive SUV. Travel test was performed on each of a rocky ground surface, a muddy road, and a sandy ground, and a tread portion after the test was observed. The number of occurrences of obvious chunking having a range and depth of 5 mm or more on the tire circumference was measured. Based on the measured number of occurrences on the tire circumference, the average number per 1 pitch of a tread pattern was calculated. For the evaluation result, a case where the average number of chunking was 3 or more was indicated as "Poor", a case where the average number of chunking was 1 or more and less than 3 was indicated as "Fair", and a case where the average number of chunking was less than 1 was indicated as "Good". An evaluation result of "Fair" or "Good" indicates that adequate off-road durability was achieved. In particular, an evaluation result of "Good" indicates that excellent off-road durability was achieved.

TABLE 1-1

| | | | Standard Example 1 | Example 1 | Example 2 | Example 3 | Comparative Example 1 |
|---|---|---|---|---|---|---|---|
| Blend | NR | Parts by mass | 40 | 55 | 55 | 55 | 55 |
| | SBR 1 | Parts by mass | 40 | 30 | 30 | 30 | 30 |
| | SBR 2 | Parts by mass | | | | | |
| | SBR 3 | Parts by mass | | | | | |
| | SBR 4 | Parts by mass | | | | | |
| | SBR 5 | Parts by mass | | | | | |
| | BR | Parts by mass | 20 | 15 | 15 | 15 | 15 |
| | Silica | Parts by mass | 60 | 70 | 90 | 55 | 110 |
| | CB1 | Parts by mass | 25 | 15 | 15 | 15 | 15 |
| | CB2 | Parts by mass | | | | | |
| | Silane coupling agent | Parts by mass | 5 | 6 | 7 | 7 | 8 |
| | Aroma oil | Parts by mass | 10 | 10 | 20 | 10 | 30 |
| Physical properties | Hardness | | 67 | 67 | 67 | 61 | 67 |
| | Strength at break TB | MPa | 23.0 | 25.5 | 24.5 | 26.0 | 24.0 |
| | Elongation at break EB | % | 500 | 580 | 530 | 600 | 480 |

TABLE 1-1-continued

| | | | Standard Example 1 | Example 1 | Example 2 | Example 3 | Comparative Example 1 |
|---|---|---|---|---|---|---|---|
| | Tensile product TB × EB | | 11500 | 14790 | 12985 | 15600 | 11520 |
| Pattern | Shape of main groove | | Step | Step | Step | Step | Step |
| | Inclination directions of lug grooves | | Opposite | Opposite | Opposite | Opposite | Opposite |
| | Two types of second lug grooves | | Yes | Yes | Yes | Yes | Yes |
| | Opening position of lug groove | | Open | Open | Open | Open | Open |
| Evaluation results | Snow performance | Index value | 100 | 105 | 102 | 115 | 98 |
| | Wet performance | Index value | 100 | 106 | 110 | 102 | 106 |
| | Low rolling performance | Index value | 100 | 106 | 103 | 112 | 98 |
| | Off-road durability performance | | Poor | Good | Good | Good | Poor |

TABLE 1-2

| | | | Comparative Example 2 | Comparative Example 3 | Comparative Example 4 | Comparative Example 5 |
|---|---|---|---|---|---|---|
| Blend | NR | Parts by mass | 55 | 55 | 55 | 55 |
| | SBR 1 | Parts by mass | 30 | 30 | 30 | 30 |
| | SBR 2 | Parts by mass | | | | |
| | SBR 3 | Parts by mass | | | | |
| | SBR 4 | Parts by mass | | | | |
| | SBR 5 | Parts by mass | | | | |
| | BR | Parts by mass | 15 | 15 | 15 | 15 |
| | Silica | Parts by mass | 45 | 70 | 70 | 70 |
| | CB1 | Parts by mass | 40 | 15 | 15 | |
| | CB2 | Parts by mass | | | | 15 |
| | Silane coupling agent | Parts by mass | 4 | 6 | 6 | 6 |
| | Aroma oil | Parts by mass | 15 | 5 | 30 | 15 |
| Physical properties | Hardness | | 67 | 72 | 59 | 67 |
| | Strength at break TB | MPa | 25.0 | 24.5 | 23.0 | 25.0 |
| | Elongation at break EB | % | 500 | 500 | 620 | 520 |
| | Tensile product TB × EB | | 12500 | 12250 | 14260 | 13000 |
| Pattern | Shape of main groove | | Step | Step | Step | Step |
| | Inclination directions of lug grooves | | Opposite | Opposite | Opposite | Opposite |
| | Two types of second lug grooves | | Yes | Yes | Yes | Yes |
| | Opening position of lug groove | | Open | Open | Open | Open |
| Evaluation results | Snow performance | Index value | 100 | 95 | 107 | 103 |
| | Wet performance | Index value | 97 | 100 | 104 | 102 |
| | Low rolling performance | Index value | 96 | 107 | 102 | 98 |
| | Off-road durability performance | | Good | Good | Poor | Good |

TABLE 1-3

| | | | Example 4 | Example 5 | Example 6 | Example 7 |
|---|---|---|---|---|---|---|
| Blend | NR | Parts by mass | 55 | 55 | 55 | 55 |
| | SBR 1 | Parts by mass | 30 | 30 | 30 | 30 |
| | SBR 2 | Parts by mass | | | | |
| | SBR 3 | Parts by mass | | | | |
| | SBR 4 | Parts by mass | | | | |
| | SBR 5 | Parts by mass | | | | |
| | BR | Parts by mass | 15 | 15 | 15 | 15 |
| | Silica | Parts by mass | 70 | 70 | 70 | 70 |
| | CB1 | Parts by mass | 15 | 15 | 15 | 15 |
| | CB2 | Parts by mass | | | | |
| | Silane coupling agent | Parts by mass | 6 | 6 | 6 | 6 |
| | Aroma oil | Parts by mass | 10 | 10 | 10 | 10 |
| Physical properties | Hardness | | 67 | 67 | 67 | 67 |
| | Strength at break TB | MPa | 25.5 | 25.5 | 25.5 | 25.5 |
| | Elongation at break EB | % | 580 | 580 | 580 | 580 |
| | Tensile product TB × EB | | 14790 | 14790 | 14790 | 14790 |
| Pattern | Shape of main groove | | Zigzag | Step | Step | Step |
| | Inclination directions of lug grooves | | Opposite | Same | Opposite | Opposite |
| | Two types of second lug grooves | | Yes | Yes | No | Yes |
| | Opening position of lug groove | | Open | Open | Open | Not open |
| Evaluation results | Snow performance | Index value | 105 | 105 | 105 | 105 |
| | Wet performance | Index value | 102 | 103 | 104 | 103 |

TABLE 1-3-continued

| | | Example 4 | Example 5 | Example 6 | Example 7 |
|---|---|---|---|---|---|
| Low rolling performance | Index value | 106 | 106 | 106 | 106 |
| Off-road durability performance | | Good | Fair | Fair | Fair |

TABLE 2

| | | | Example 8 | Example 9 | Comparative Example 6 | Example 10 | Example 11 | Example 12 | Example 13 |
|---|---|---|---|---|---|---|---|---|---|
| Blend | NR | Parts by mass | 55 | 55 | 55 | 55 | 55 | 55 | 55 |
| | SBR 1 | Parts by mass | | | | | 20 | 40 | 45 |
| | SBR 2 | Parts by mass | 30 | | | | | | |
| | SBR 3 | Parts by mass | | 30 | | | | | |
| | SBR 4 | Parts by mass | | | 30 | | | | |
| | SBR 5 | Parts by mass | | | | 30 | | | |
| | BR | Parts by mass | 15 | 15 | 15 | 15 | 25 | 5 | |
| | Silica | Parts by mass | 70 | 70 | 70 | 70 | 70 | 70 | 70 |
| | CB1 | Parts by mass | 15 | 15 | 15 | 15 | 15 | 15 | 15 |
| | CB2 | Parts by mass | | | | | | | |
| | Silane coupling agent | Parts by mass | 6 | 6 | 6 | 6 | 5 | 5 | 5 |
| | Aroma oil | Parts by mass | 10 | 10 | 10 | 10 | 10 | 10 | 10 |
| Physical properties | Hardness | | 67 | 67 | 67 | 67 | 67 | 67 | 67 |
| | Strength at break TB | MPa | 25.0 | 24.5 | 24.0 | 23.5 | 24.5 | 24.0 | 23.5 |
| | Elongation at break EB | % | 550 | 530 | 520 | 550 | 530 | 520 | 550 |
| | Tensile product TB × EB | | 13750 | 12985 | 12480 | 12925 | 12985 | 12480 | 12925 |
| Pattern | Shape of main groove | | Step | Step | Step | Step | Step | Step | Step |
| | Inclination directions of lug grooves | | Opposite | Opposite | Opposite | Opposite | Opposite | Opposite | Opposite |
| | Two types of second lug grooves | | Yes | Yes | Yes | Yes | Yes | Yes | Yes |
| | Opening position of lug groove | | Open | Open | Open | Open | Open | Open | Open |
| Evaluation results | Snow performance | Index value | 105 | 108 | 110 | 106 | 108 | 102 | 98 |
| | Wet performance | Index value | 106 | 100 | 95 | 102 | 102 | 110 | 112 |
| | Low rolling performance | Index value | 105 | 105 | 105 | 102 | 106 | 105 | 103 |
| | Off-road durability performance | | Good | Good | Good | Good | Good | Good | Good |

TABLE 3

| | | Blended amount |
|---|---|---|
| Stearic acid | Parts by mass | 2 |
| Zinc oxide | Parts by mass | 3 |
| Anti-aging agent | Parts by mass | 4 |
| Sulfur | Parts by mass | 1 |
| Vulcanization accelerator 1 | Parts by mass | 2 |
| Vulcanization accelerator 2 | Parts by mass | 1 |

Types of raw materials used as indicated in Tables 1 to 3 are described below.

NR: Natural rubber, SIR20, available from PT. Kirana Sapta

SBR 1: Terminal-modified styrene-butadiene rubber, HPR850, available from JSR Corporation (modification group: amine group, alkoxysilyl group; vinyl content: 59 mass %; styrene content: 27 mass %)

SBR 2: Terminal-modified styrene-butadiene rubber, Nipol NS616, available from ZS Elastomers Co., Ltd. (modification group: polyorganosiloxane group; vinyl content: 67 mass %; styrene content: 21 mass %)

SBR 3: Terminal-modified styrene-butadiene rubber, HPR840, available from JSR Corporation (modification group: amine group, alkoxysilyl group; vinyl content: 40 mass %; styrene content: 10 mass %)

SBR 4: Terminal-modified styrene-butadiene rubber, Nipol NS612, available from ZS Elastomers Co., Ltd. (modification group: polyorganosiloxane group; vinyl content: 30 mass %; styrene content: 15 mass %)

SBR 5: Unmodified styrene-butadiene rubber, NS460, available from ZS Elastomers Co., Ltd. (vinyl content: 63 mass %; styrene content: 25 mass %)

BR: Butadiene rubber, Nipol 1220, available from Zeon Corporation

Silica: Ultrasil 7000 GR, available from Evonik Industries AG

CB1: Carbon black, SEAST7HMN234, available from Tokai Carbon Co., Ltd. (nitrogen adsorption specific surface area $N_2SA$: 126 $m^2/g$)

CB2: Carbon black, SEAST 9M N110, available from Tokai Carbon Co., Ltd. (nitrogen adsorption specific surface area $N_2SA$: 142 $m^2/g$)

Silane coupling agent: Si69 available from Evonik Degussa

Aroma oil: Extract No. 4S, available from Showa Shell Sekiyu K.K.

Stearic acid: beads stearic acid, available from NOF Corporation

Zinc oxide: Zinc Oxide III, available from Seido Chemical Industry Co., Ltd.

Anti-aging agent: 6PPD, available from Korea Kumho Petrochemical

Sulfur: Golden Flower oil treated sulfur powder, available from Tsurumi Chemical Industry Co., Ltd.

Vulcanization accelerator 1: NOCCELERCZ-G, available from Ouchi Shinko Chemical Industrial Co., Ltd.

Vulcanization accelerator 2: Soxinol D-G available from Sumitomo Chemical Co., Ltd.

As is clear from Table 1, each of pneumatic tires of Examples 1 to 13 improved wet performance, low rolling resistance performance, and off-road durability performance with respect to those of Standard Example 1 and provided these performances in a well-balanced, highly compatible manner. On the other hand, Comparative Example 1 had the large blended amount of the silica, the snow performance, degrading low rolling resistance performance, and off-road durability performance. Comparative Example 2 had the small blended amount of the silica, degrading the wet performance and low rolling resistance performance. Comparative Example 3 had the high hardness, degrading the snow performance. Comparative Example 4 had the low hardness, degrading the off-road durability performance. Comparative Example 5 had the large nitrogen adsorption specific surface area of the carbon black, degrading the low rolling resistance performance. Comparative Example 6 had the small vinyl amount of the styrene-butadiene rubber, degrading the snow performance.

The invention claimed is:

1. A pneumatic tire, comprising:

a tread portion extending in a tire circumferential direction and having an annular shape;

a pair of sidewall portions respectively disposed on both sides of the tread portion;

a pair of bead portions each disposed on an inner side of the pair of sidewall portions in a tire radial direction;

a carcass layer mounted between the pair of bead portions; and a plurality of reinforcing layers disposed on an outer circumferential side of the carcass layer in the tread portion, the tread portion being made of two layers, an undertread layer disposed on an outer circumferential side of the reinforcing layer and a cap tread layer disposed on an outer circumferential side of the undertread layer and constituting a road contact surface of the tread portion;

the cap tread layer being made of a rubber composition in which 50 parts by mass to 100 parts by mass of silica and 5 parts by mass to 25 parts by mass of carbon black are blended per 100 parts by mass of diene rubber containing 50 mass % or more of natural rubber and 20 mass % or more and 40 mass % or less of styrene-butadiene rubber, the styrene-butadiene rubber being terminal-modified styrene-butadiene rubber having a vinyl content of 35 mass % to 70 mass %, the carbon black having a nitrogen adsorption specific surface area $N_2SA$ of less than 130 $m^2/g$, and the rubber composition constituting the cap tread layer having a tensile product TB×EB calculated as a product of strength at break TB [unit: MPa] and elongation at break EB [unit: %] of 12000 or more and having a hardness of 60 or more and 70 or less.

2. The pneumatic tire according to claim 1, wherein the styrene-butadiene rubber has the vinyl content ranging from 55 mass % to 70 mass % and a styrene content ranging from 20 mass % to 30 mass %.

3. The pneumatic tire according to claim 1, wherein the diene rubber contains 5 mass % or more and 20 mass % or less of butadiene rubber besides the natural rubber and the styrene-butadiene rubber.

4. The pneumatic tire according to claim 1, wherein on an outer surface of the tread portion, four main grooves extending along the tire circumferential direction and a plurality of land portions defined by the main grooves are formed, the four main grooves comprise two center main grooves disposed on both sides of a tire equator and two shoulder main grooves disposed on an outer side in a tire width direction of each of the two center main grooves, each of the main grooves has a circumferential extending portion extending in the tire circumferential direction and is formed in a step shape at different positions in two tire width directions, between the center main groove and the shoulder main groove that are adjacent, a second lug groove extending in the tire width direction and having both ends opening to the center main groove and the shoulder main groove is disposed, in an outer side in the tire width direction of the shoulder main groove, a shoulder lug groove extending in the tire width direction across the ground contact edge and having one end opening to the shoulder main groove is disposed, the second lug groove and the shoulder lug groove have inclination directions in the tire circumferential direction with respect to the tire width direction opposite to each other, of a plurality of the second lug grooves disposed side by side in the tire circumferential direction, two types of the second lug grooves having different inclination angles with respect to the tire width direction are alternately disposed, the second lug grooves opening to the center main groove and the shoulder main groove open to the circumferential extending portion located closer to the second lug groove of the circumferential extending portions each included in the center main groove and the shoulder main groove formed in the step shape, and the shoulder lug groove opening to the shoulder main groove opens to the circumferential extending portion located closer to the shoulder lug groove of the circumferential extending portions included in the shoulder main groove formed in the step shape.

5. The pneumatic tire according to claim 2, wherein the diene rubber contains 5 mass % or more and 20 mass % or less of butadiene rubber besides the natural rubber and the styrene-butadiene rubber.

6. The pneumatic tire according to claim 5, wherein on an outer surface of the tread portion, four main grooves extending along the tire circumferential direction and a plurality of land portions defined by the main grooves are formed, the four main grooves comprise two center main grooves disposed on both sides of a tire equator and two shoulder main grooves disposed on an outer side in a tire width direction of each of the two center main grooves, each of the main grooves has a circumferential extending portion extending in the tire circumferential direction and is formed in a step shape at different positions in the tire width direction, between the center main groove and the shoulder main groove that are adjacent, a second lug groove extending in the tire width direction and having both ends opening to the center main groove and the shoulder main groove is disposed, in an outer side in the tire width direction of the shoulder main groove, a shoulder lug groove extending in the tire width direction across the ground contact edge and having one end opening to the shoulder main groove is disposed, the second lug groove and the shoulder lug groove have inclination directions in the tire circumferential direction with respect to the tire width direction opposite to each other, of a plurality of the second lug grooves disposed side by side in the tire circumferential direction, two types of the second lug grooves having different inclination angles with respect to the tire width direction are alternately disposed, the second lug grooves opening to the center main groove and the shoulder main groove open to the circumferential extending portion located closer to the second lug groove of the circumferential extending portions each included in the center main groove and the shoulder main groove formed in the step shape, and the shoulder lug groove opening to the shoulder main groove opens to the circumferential extending portion located closer to the shoulder lug groove of the circumferential extending portions included in the shoulder main groove formed in the step shape.

* * * * *